PULSE STEERING CIRCUIT APPLIED TO DIFFERENTIAL AMPLIFIER
Filed June 18, 1964
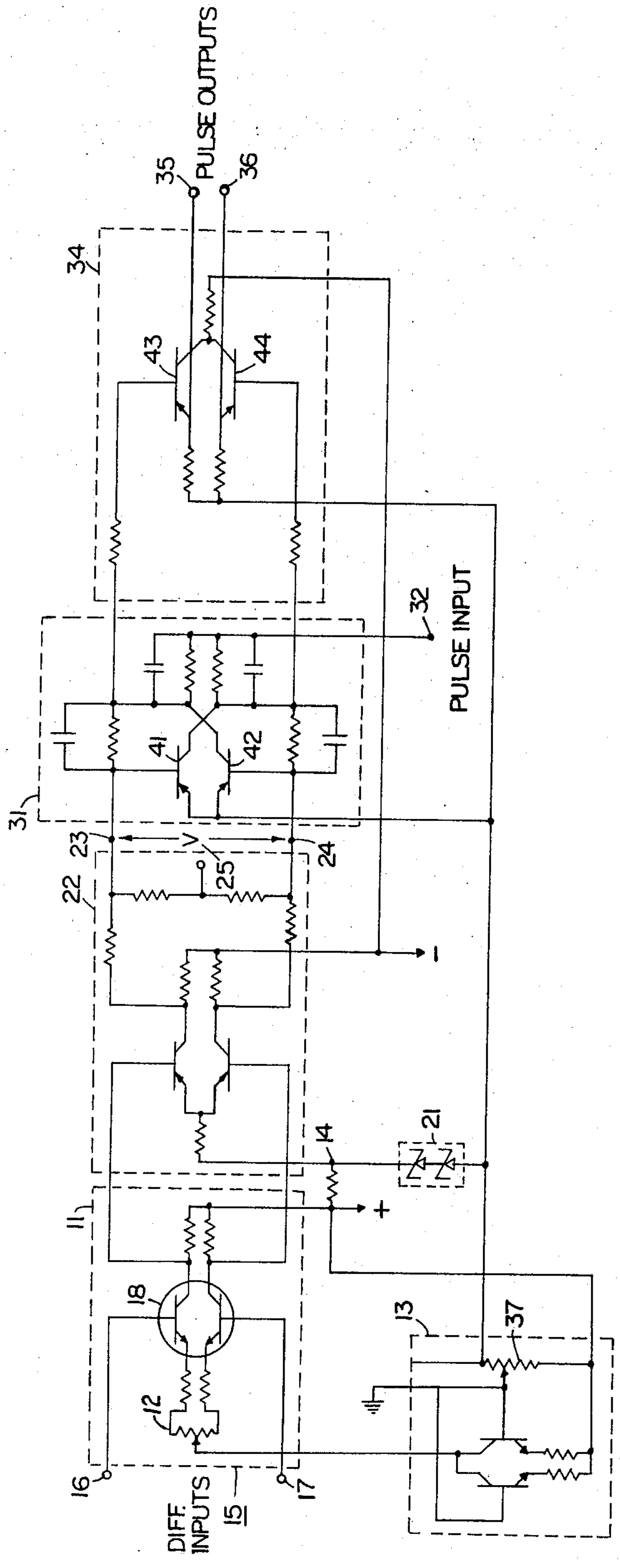
INVENTOR
WILLIAM SIMON
BY,
Richard F. Benway
ATTORNEY United States Patent Office 3,343,098
Patented Sept. 19, 1967

3,343,098
PULSE STEERING CIRCUIT APPLIED TO DIFFERENTIAL AMPLIFIER

William Simon, Cambridge, Mass., assignor to Massachusetts Institute of Technology, Cambridge, Mass., a corporation of Massachusetts Filed June 18, 1964, Ser. No. 376,056
2 Claims. (Cl. 330—30)

This invention relates to pulse steering circuits and more particularly to such circuits as applied to differential amplifiers.

An inherent limitation of prior art differential amplifiers is that they retain a memory of prior pulses directed through its circuit owing to the hysteresis of the circuit. Obviously, the settling time required to accommodate changes in routing of pulses must be sufficiently long to permit this memory to fade. If the period is not long enough, pulses may be routed in the wrong direction. The present invention overcomes this limitation because each pulse output is completely independent of the previous pulse output.

Another difficulty with prior art devices is that if the circuit is in transition (the circuit is part way between directing pulses in one direction as opposed to the other direction) the pulse will split. That is, two half pulses will now appear, one half at each output. The present invention obviates this problem because it cannot produce split pulses.

It is also possible in prior art devices to have both paths open at the same time such that two pulses are produced, one at each output, while only one pulse is applied to the input. This error is impossible with the present invention.

Therefore, an object of this invention is to provide a more reliable steering circuit.

Another object of this invention is to provide a higher speed differential amplifier.

Another object of this invention is to produce a circuit incapable of producing two pulses simultaneously.

Other objects and features of this invention will become more apparent by reference to the following description when taken in conjunction with the accompanying drawing which shows a differential amplifier utilizing the pulse steering circuit.

Referring to the drawing, differential inputs are applied to terminals 16 and 17. Input pulses are applied to terminal 32 and appear at either output 35 or 36 depending on the differential input.

Zero adjust 13 is provided merely to compensate for differences in voltage between companion circuit components connected to a common chassis. By means of potentiometer 37, the ground potential is adjusted according to the difference existing between the differential amplifier and the remaining circuit to which it is connected.

Zener diodes 21 are inserted in order to regulate the voltage appearing at terminal 14. Differential amplifier 11 is arranged push-pull. The transistor amplifiers of this section are of a double unit (two transistors mounted in a common case as a 2n2480) in order to provide a maximum assurance of balanced operation. By means of potentiometer 12, the circuit is balanced such that zero input difference will produce zero output voltage. The difference in voltages applied between 17 and 16 is amplified push-pull and applied to amplifier circuit 22 which further amplifies the signal such that between terminals 23 and 24 a steering voltage 25 appears.

According to the polarity of the steering voltage transistor 41 will conduct while transistor 42 will be cut off. With a change in polarity the opposite will prevail, transistor 42 will conduct while transistor 41 will be cut off.

Negative pulses that appear at 32 will take the path through the conducting transistor and will be applied to emitter follower 43 or 44 depending upon whether transistor 41 or 42 is conducting. Accordingly, the pulses will then appear at output terminals 35 and 36.

Examining the circuit configuration surrounding transistors 41 and 42 a similarity to be conventional flip-flop becomes apparent. However, the normal terminal to which a constant negative D-C potential is usually applied is the point where negative pulses are applied. As in the flip-flop only one output is possible for the conducting transistor will hold the other non-conducting transistor off.

Assuming the steering voltage is in transition, that is, in the process of changing polarity from one direction to the other, or that the difference voltage is very small, the negative pulse applied to terminal 32 will appear at both transistors; however, if one transistor conducts only slightly, the output of that transistor being coupled back to the input of the other transistor will hold that transistor off.

Accordingly, the present invention is stable in only one of two states at any given moment, thereby making pulse splitting, multiple pulse generating, or ambiguity resulting from previous pulses, impossible. With the steering voltage 25 not clearly controlling (a voltage which doesn't switch either transistors of the steering circuit in any particular direction) the application of a pulse at input 32 will trip the circuit one way or the other.

With the exception of the zero adjust grouping 13 and the Zener diodes 21, the circuit is symmetrical about an imaginary line drawn through the circuit midway between the differential input and pulse output terminals.

While I have described the above principles of my invention in connection with specific apparatus, it is to be clearly understood that this description is only made by way of example and not as a limitation on the scope of my invention as set forth in the objects thereof and in the accompanying claims.

What is claimed is:

1. A pulse steering circuit comprising,
   first and second transistors each having an emitter, base and collector,
   said emitters of said first and second transistor connected to ground potential,
   first and second impedance means,
   the collector of said first transistor connected to the base of said second transistor through said first impedance means,
   the collector of said second transistor connected to the base of said first transistor through said second impedance means,
   steering voltage input means extending from the base of said first transistor to the base of said second transistor,
   pulse input means at a common, transistor free, termination of said first and second impedance means,
   pulse output means at the collectors of said first and second transistors,
   said first and second impedance means are substantially identical groupings of a first parallel resistor and capacitor in series with a second paralleled resistor and capacitor.

2. A pulse steering circuit according to claim 1 which further includes;
   a differential amplifier which processes an input voltage and applies said processed input voltage as a steering voltage to said first and second amplifier, and
   first and second isolation amplifiers for receiving and power amplifying output pulses from said first and second transistors, said first isolation amplifier power amplifying pulses from said first transistor, and said second isolation amplifier power amplifying pulses from said second transistor.

References Cited

UNITED STATES PATENTS

| | | | |
|---|---|---|---|
| 3,045,128 | 7/1962 | Skerritt | 307—88.5 |
| 3,048,713 | 8/1962 | Tellerman et al. | 328—105X |
| 3,197,709 | 7/1965 | Antonio et al. | 330—18 |

FOREIGN PATENTS

| | | |
|---|---|---|
| 1,115,295 | 10/1961 | Germany. |

OTHER REFERENCES

Army Technical Manual, TM 11–690, pages 202–209, March 1959, Tk6550–U69–690–1959.

ROY LAKE, *Primary Examiner.*

E. C. FOLSOM, F. D. PARIS, *Assistant Examiners.*